(12) United States Patent
Kido et al.

(10) Patent No.: US 6,471,068 B1
(45) Date of Patent: Oct. 29, 2002

(54) METHOD AND APPARATUS FOR ACCESSING AN OBJECT, AND STORAGE MEDIUM STORING A PROGRAM FOR CONTROLLING ACCESS TO AN OBJECT

(75) Inventors: Akio Kido, Tokyo-to (JP); Reiji Todani, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/132,406

(22) Filed: Aug. 11, 1998

(30) Foreign Application Priority Data

Mar. 6, 1998 (JP) .......................................... 10-054722

(51) Int. Cl.[7] .............................................. G06F 17/00
(52) U.S. Cl. .................... 207/103 R; 709/310; 709/315
(58) Field of Search ...................... 705/8, 17; 709/226, 709/100–332; 707/2; 395/712; 702/1–206

(56) References Cited

U.S. PATENT DOCUMENTS

| | | | | |
|---|---|---|---|---|
| 5,438,508 A | * | 8/1995 | Wyman | ........................ 705/8 |
| 5,729,688 A | * | 3/1998 | Kim et al. | ................... 709/226 |
| 5,842,198 A | * | 11/1998 | Suzuki et al. | ................... 707/2 |
| 5,970,252 A | * | 10/1999 | Buxton et al. | ............... 395/712 |
| 6,085,168 A | * | 7/2000 | Mori et al. | .................... 705/17 |

* cited by examiner

Primary Examiner—David Jung
(74) Attorney, Agent, or Firm—Thomas A. Beck; Louis P. Herzberg

(57) ABSTRACT

An object of the invention is to provide an information processing system that enables a user to always use a business object in the assurance of its credibility. It provides a business object (software component) for use in highly secured information processing, such as an accounting calculation or an electronic commerce, is rendered to contain therein electronic certificate and signature of its provider, in addition to object management information such as term's validity information. In so doing, it becomes possible to check credibility of the object. Also, if a given object is found to have a problem about its credibility, another provider of another object with the same name that exists on a predetermined object retrieval path, as well as its term's validity information will be checked to automatically locate such an object on a network that passes the test of credibility, thereby to automatically correct the security problem.

9 Claims, 8 Drawing Sheets

[Figure 1]
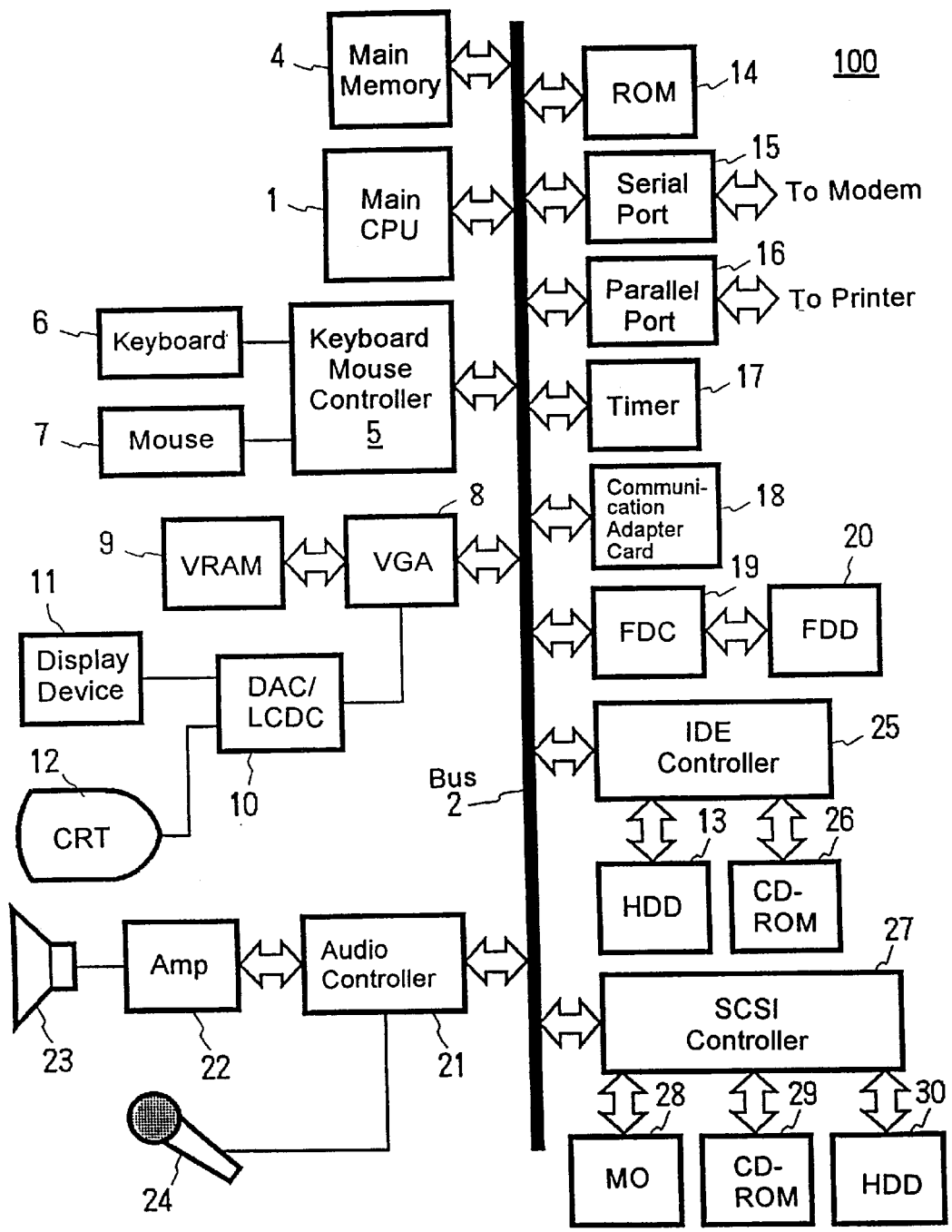

[Figure 2]
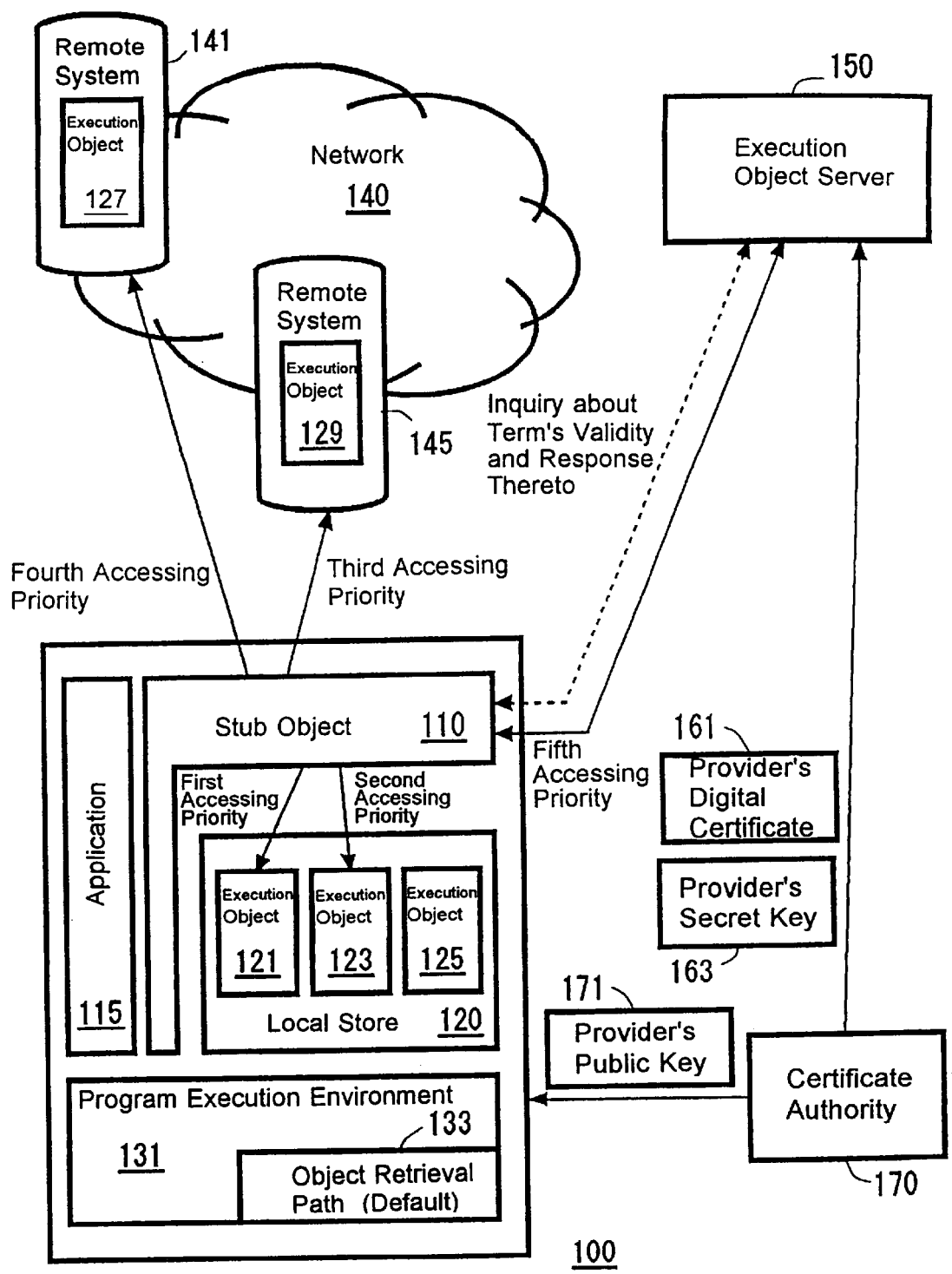

[Figure 3]
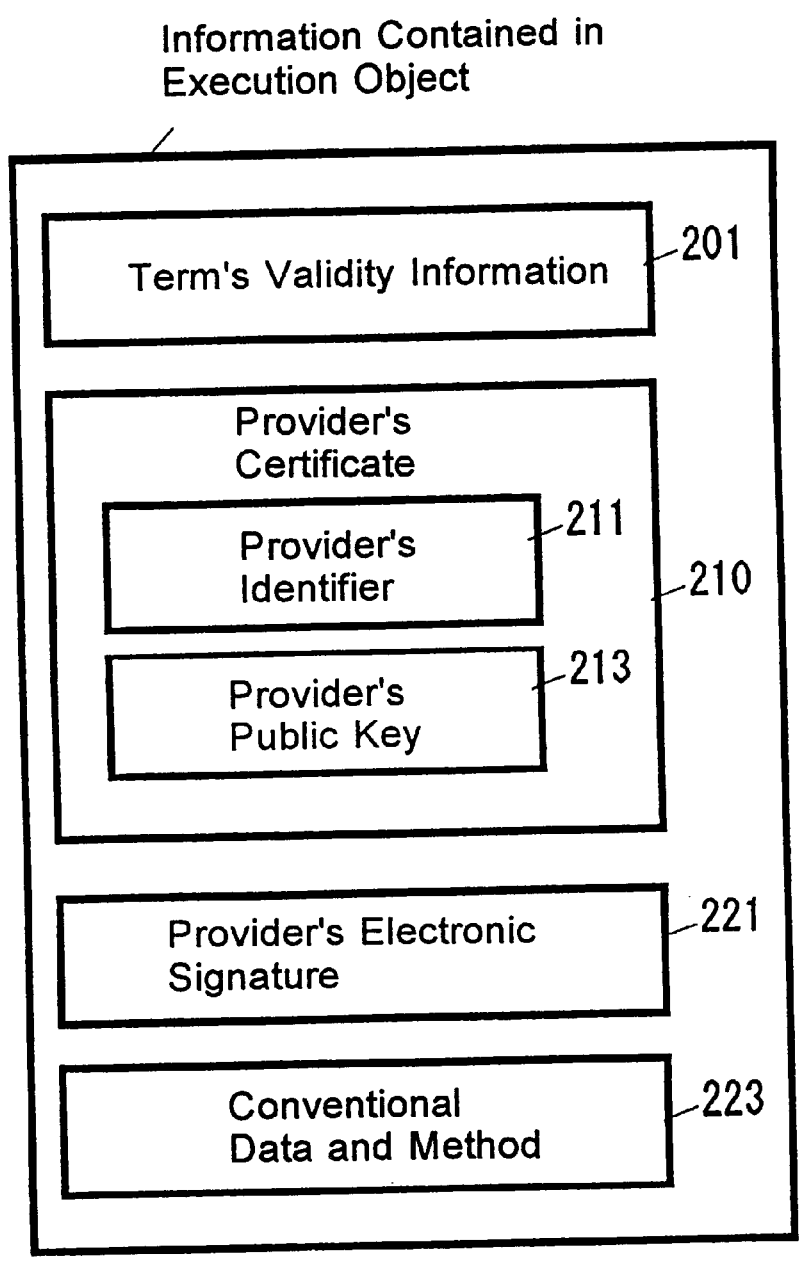

[Figure 4]
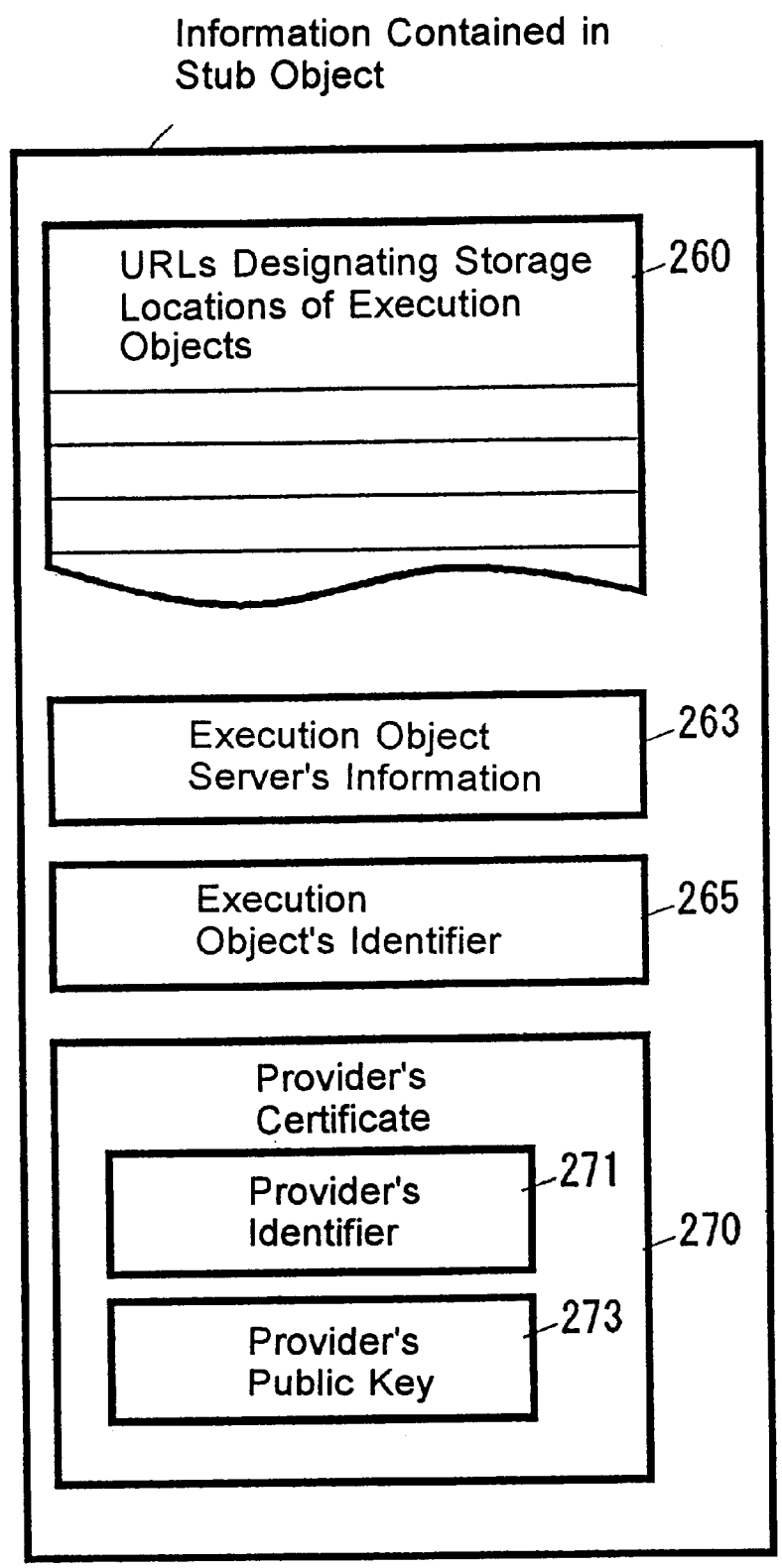

[Figure 5]
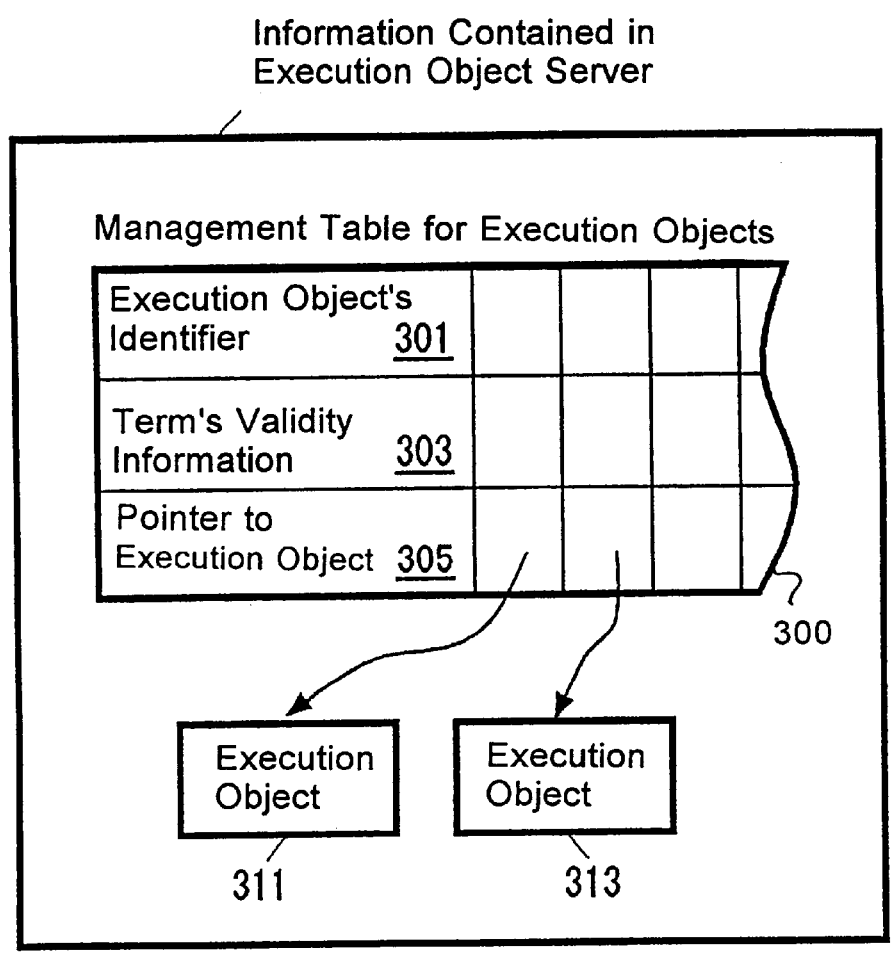

[Figure 6]
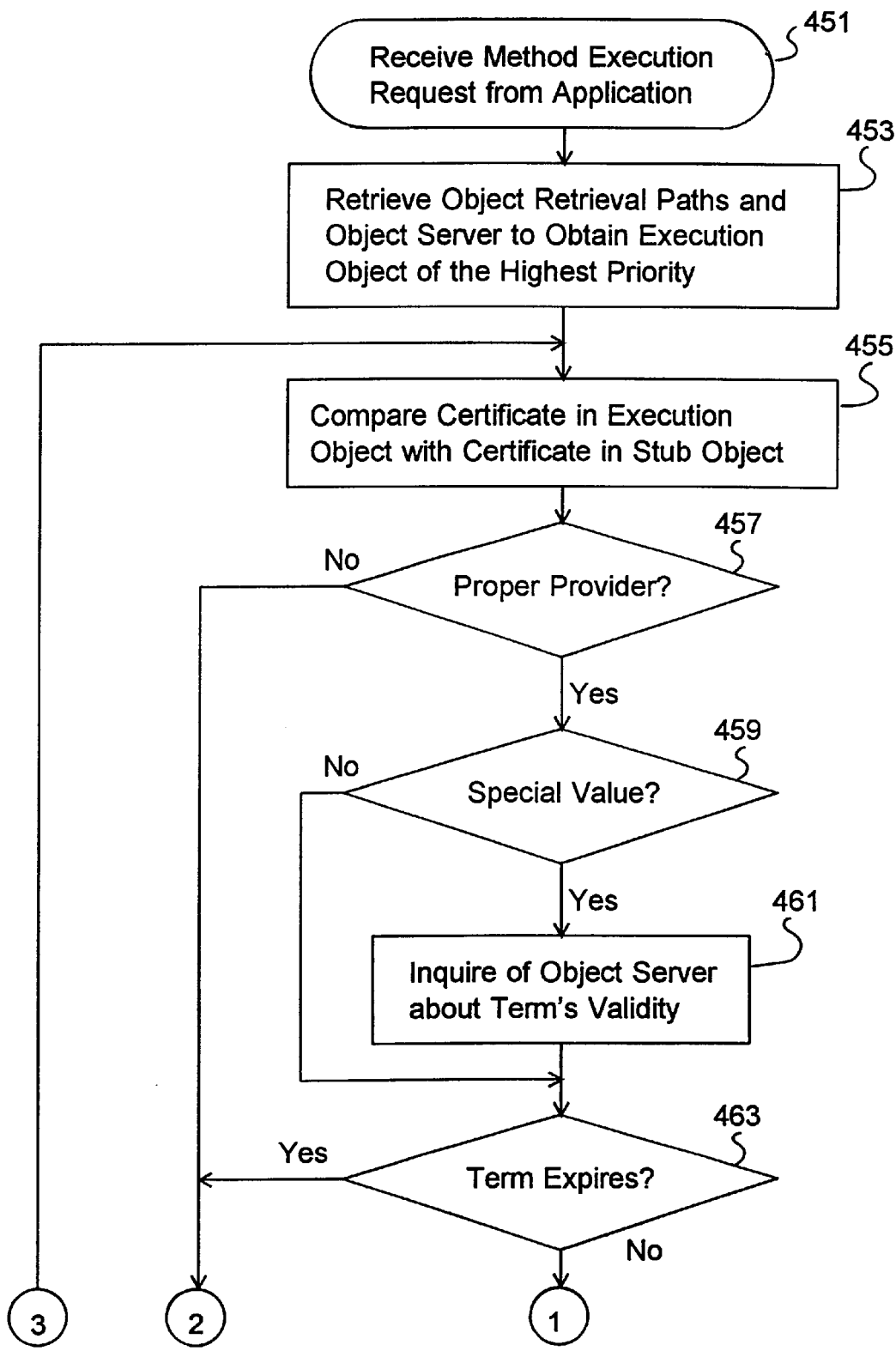

[Figure 7]
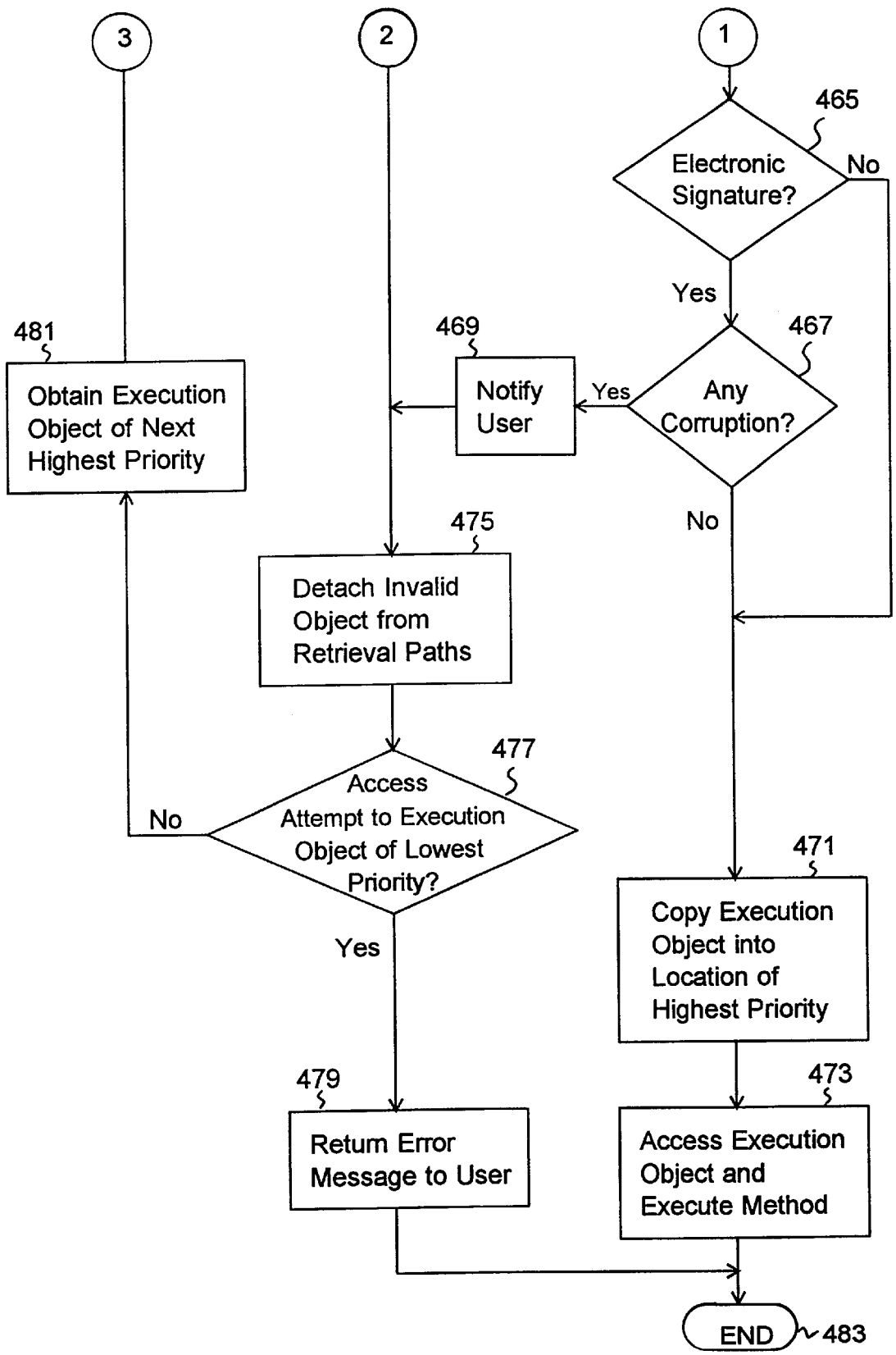

[Figure 8]
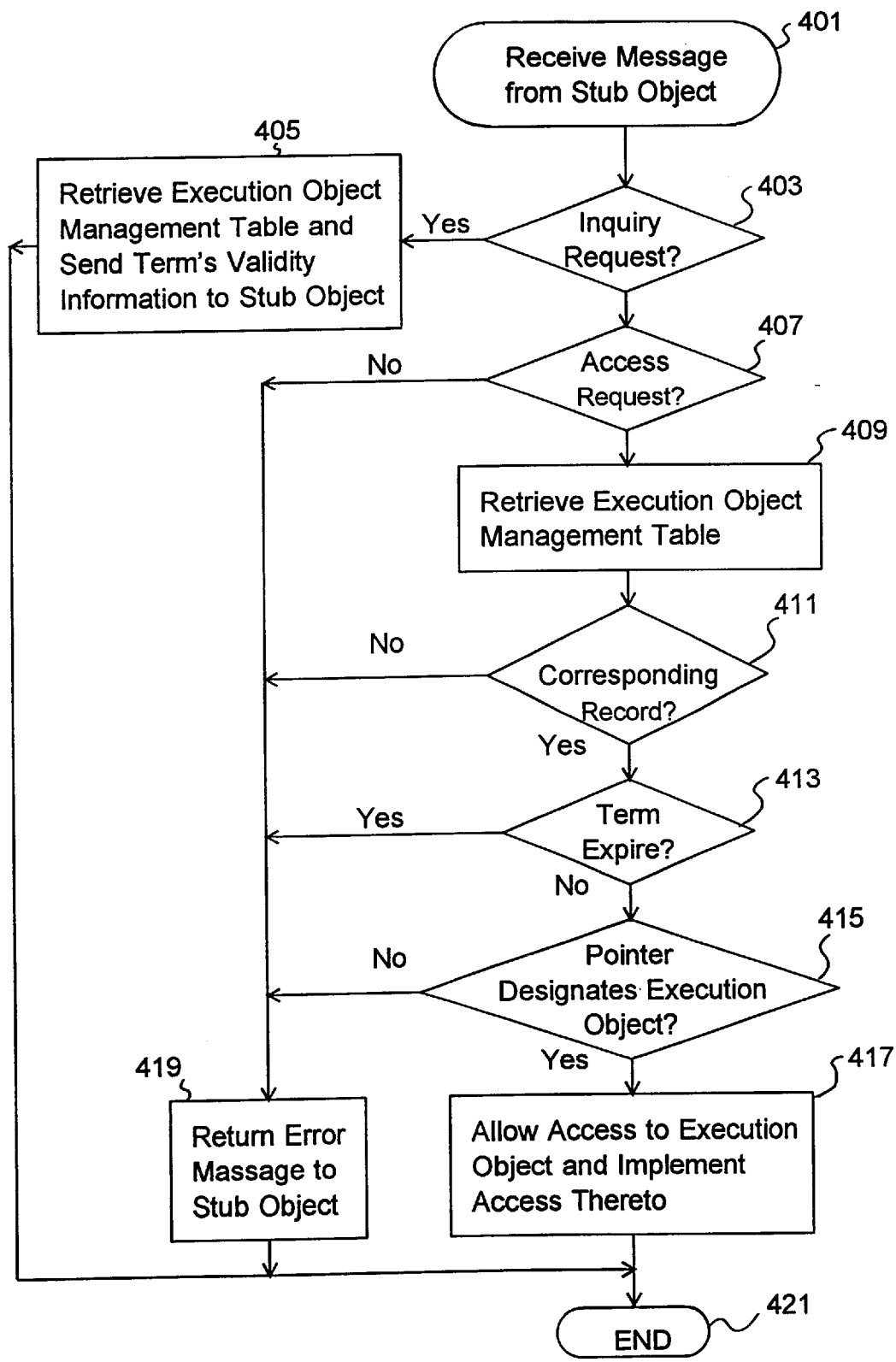

METHOD AND APPARATUS FOR ACCESSING AN OBJECT, AND STORAGE MEDIUM STORING A PROGRAM FOR CONTROLLING ACCESS TO AN OBJECT

FIELD OF THE INVENTION

This invention relates to an information processing method and, more particularly, to a method of checking reliability/credibility of objects existing on a network, searching/retrieving those objects of higher credibility and using the same.

BACKGROUND ART

In the field of highly secured information processing, such as an accounting calculation or an electronic commerce, it has been strongly desired to provide an assurance of credibility of rule sets and data that are embedded into business objects (or classes) for use in such information processing.

In particular, for those business objects referring to rule sets (e.g., logic for calculating various taxes and logic for calculating various financial evaluation indices) and data that are frequently changed to reflect day-to-day transactions, including currency exchange rates and accounting rules, as well as revisions of the related laws, it is required that the referenced rule sets and data are created/provided by credible creators/providers and yet they are still valid at the reference time.

For example, if a user of a business object refers to an obsolete currency exchange rate, or uses an older accounting rule that is already illegal, this may cause the user's business to be detrimentally affected. On the other hand, even if a user's business is damaged by an erroneous reference to an obsolete business object provided from a credible provider, or another object with the same name provided from an incredible provider, the said credible provider may be claimed to be liable for his/her provided business object.

Such a business object has been normally referred to by its name alone. That is, object retrieval is performed by determining whether or not there exists any object with the same name on a predetermined object retrieval path. Thus, if multiple objects with the same name exist on the retrieval path, one of the objects first located along the retrieval path in accordance with its defined retrieval order may be used/referred to without checking credibility thereof. Namely, there has been no checking as to whether or not the latter object were updated, who created the latter object, and the like.

To address such a problem of credibility, a prior approach enables an object provider to centrally control objects in such a way that the newest objects are dynamically downloaded from a server of the provider via a network. However, this approach is not an effective solution to the aforesaid problem. This is because, in a case where another object with the same name provided from another provider is entered into the retrieval path in an intermixed manner, or where data caching or data replication is performed via the network without concurrently purging an older object stored therein, the newest object intentionally provided from the former provider for use by a user may not be necessarily referred to by the user.

In particular, if an object in transit is massaged/corrupted by a malicious third party, or the corrupted object is erroneously referred to, a user may be unable to find such a corruption. As a result, the user may refer to an unintended object with the same name but with a completely different content, or another object changed to contain a malicious numerical value.

Also, there is an additional case where contents of currently valid objects are to be invalidated as of a certain fixed date (e.g., as a result of enforcement of a new law from a prescribed date, calculation logic for taxes has to be timely changed). To cope with such a case, there has been a need for an object provider to prevent older objects from being continually used by their current users after such an enforcement date and to cause the newest objects to be used by the users instead.

In such a case, a provider has normally informed current users of switching to the newest objects and of an associated switching method, whereas each user has performed switching to the newest objects (including changing of a path and replacement of the involved objects) in accordance with the informed procedure. Thus, each user has been required to perform change work for making reference to the newest objects, which has resulted in a significant burden to each user.

A prior invention disclosed in Japanese Patent Publication (PUPA) H8-6784, entitled "System and Processing Method for Preventing Usage of Unauthorized Copy of Software/Copyright Work", is directed to a technique for preventing unauthorized use of licensed software by a user and for enabling a license granted to a rightful user alone to be automatically extended. However, this prior technique is quite apart from this invention in that it does not intend to check security of software on a user's side, nor does it intend to automatically correct a security problem. Thus, its configuration and technical advantages are significantly different from those of this invention as briefed below.

SUMMARY OF THE INVENTION

In this invention, various storage means distributed across a network are prioritized in such a way that a given object to be used may be flexibly determined no matter where the object exists and that such prioritization may be easily changed. Also, since object management information (e.g., term's validity information) is embedded into an object, whenever the object is used at an user's side, it is possible to determine whether or not the term of this object has been expired.

In one aspect of this invention, for each object, a signature and a certificate of its provider are embedded therein, so that its security may be checked at its user's side. In the above identified prior invention, however, there is no such certificate or signature of a provider. Rather, term's validity information is solely used for authorizing a rightful user to use the licensed software until the expiration date and, thus, the prior invention cannot ensure that the licensed software is the newest one and yet it is still valid.

In the prior invention, it is essential to download a key (or a portion of the licensed software) from a host to a terminal that is uniquely associated with the key. On the contrary, this invention is arranged to have information on retrieval paths, since it takes account of a function for retrieving an object on a network and a distributed environment that does not accompany downloading. Thus, this invention may be applied to such software that comprises a set of small components written in "Java" (trademark of Sun Microsystems), and to distributed object software as well that does not require any execution software existing on a local system.

The following problems are solved by the present invention.

It is therefore an object of this invention solve the following problems. It is an object to provide an information processing system that enables a user to always use a business object in the assurance of its credibility.

It is another object of this invention to provide an information processing system that is secure against usage of a business object corrupted by a malicious third party.

It is another object of this invention to provide an information processing system that enables to flexibly change a site which should obtain an object to be used.

It is another object of this invention to reduce an amount of user's work required for changing an object to be used.

It is another object of this invention to provide a computer system that does not depend on a platform of a local system.

It is another object of this invention to reduce an amount of communication data in an information processing system.

It is another object of this invention to provide an information processing system that enables to flexibly provide an object which should have a content requested by an application.

It is another object of this invention to provide, as a framework of a business object, a common mechanism for assuring security of an object transferred in a network environment.

It is another object of this invention to provide an assurance of credibility even in an environment provided with a weak security mechanism such as a Java environment.

It is another object of this invention to provide a system that enables to maintain credibility of such information with a fixed time limit (e.g., a rule set, including a currency exchange rate, an accounting rule, a tax law or the like) and to make a reference thereto on a real-time basis.

BRIEF DESCRIPTION OF THE DRAWINGS

These and other objects, features, and advantages of the present invention will become apparent upon further consideration of the following detailed description of the invention when read in conjunction with the drawing figures.

FIG. 1 is a block diagram showing a hardware configuration of a local system in accordance with this invention.

FIG. 2 is a conceptual diagram of an information processing system in a preferred embodiment of this invention.

FIG. 3 is a block diagram showing a structure of information contained by an execution object in a preferred embodiment of this invention.

FIG. 4 is a block diagram showing a structure of information contained by a stub object in a preferred embodiment of this invention.

FIG. 5 is a block diagram showing a structure of information contained by an execution object server in a preferred embodiment of this invention.

FIG. 6 is a flow chart showing a procedure for checking/referencing of an execution object in a preferred embodiment of this invention.

FIG. 7 is a flow chart showing a procedure for checking/referencing of an execution object in a preferred embodiment of this invention.

FIG. 8 is a flow chart showing an operational procedure of an execution object server for receiving a message from a stub object in a preferred embodiment of this invention.

DESCRIPTION OF SYMBOLS

100 Local System
110 Stub Object
120 Local Store
121 to 129 Execution Objects
131 Program Execution Environment
133 Default Object Retrieval Path
140 Network
141, 145 Remote Systems
150 Execution Object Server
161 Digital Certificate of Provider of Execution Object
163 Secret Key of Provider of Execution Object
170 Independent Certificate Authority
171 Public Key of Provider of Execution Object.

DETAILED DESCRIPTION OF INVENTION

The present invention provides the following means for solving the problems. A business object (software component) for use in highly secured information processing, such as an accounting calculation or an electronic commerce, is rendered to contain therein electronic certificate and signature of its provider, in addition to object management information such as term's validity information. In so doing, it becomes possible to check credibility of the object. Also, if a given object is found to have a problem about its credibility, another provider of another object with the same name that exists on a predetermined object retrieval path, as well as its term's validity information will be checked to automatically locate such an object on a network that passes the test of credibility, thereby to automatically correct the security problem.

In one aspect of this invention, there is provided a method of accessing an object, the method being adapted for execution in a local system that contains first path information specifying a path for accessing a first object stored in a first storage means, second path information specifying a path for accessing a second object stored in a second storage means, and third path information specifying a path for accessing a third object stored in a third storage means, the method comprising the steps of:

(a) accessing the first object stored in said first storage means based on said first path information;

(b) evaluating object management information included in said first object;

(c) if, as a result of the said evaluation, it is determined that the object management information of said first object does not match a predetermined condition, then accessing the second object stored in said second storage means based on said second path information;

(d) evaluating object management information included in said second object; and (e) if, as a result of the said evaluation, it is determined that the object management information of said second object does not match a predetermined condition, then accessing the third object stored in said third storage means based on said third path information.

Note that, in the claims of the present specification, the expressions "first storage means" through "third storage means" represent a concept covering those storage means provided in a local system, in a domain, in a remote system and in an execution object server respectively. Also, the expression "path information", denoting information specifying a path for accessing a specific object, represents a concept covering a path list for registering a plurality of paths based on priorities. And, the expression "evaluating term's validity information" represents a concept covering an evaluation as to whether or not a given equality (or inequality) is true. Further, the expression "object management information" represents a concept covering "term's validity information", "electronic certificate/signature" of an object provider, as subsequently detailed in the present specification.

In another aspect of this invention, there is provided a method of accessing an object, the method being adapted for execution in a local system that contains first path information specifying a path for accessing a first object stored in a first storage means, and second path information specifying a path for accessing a second object stored in a second storage means, the method comprising the steps of:

(a) receiving from an application an object access request including object specifying information;

(b) accessing the first object stored in said first storage means based on said first path information;

(c) evaluating object management information included in said first object; and (d) if, as a result of the said evaluation, it is determined that the object management information of said first object does not match a predetermined condition, then accessing the second object stored in said second storage means based on said second path information.

In another aspect of this invention, there is provided a method of accessing an object, the method being adapted for execution in a local system that contains first path information specifying a path for accessing a first object stored in a local storage means existing within the local system, and second path information specifying a path for accessing a second object stored in a remote storage means connected to said local system via a network, the method comprising the steps of:

(a) accessing the first object stored in said local storage means based on said first path information;

(b) evaluating term's validity information included in said first object;

(c) if, as a result of the said evaluation, it is determined that the term of said first object has been expired, then accessing the second object stored in said remote storage means based on said second path information; and (d) copying at least a portion of said object into said local storage means.

In another aspect of this invention, there is provided a method of accessing an object, the method being adapted for execution in a local system that contains first path information specifying a path for accessing a first object stored in a first storage means, and second path information specifying a path for accessing a second object stored in a second storage means, the method comprising the steps of:

(a) accessing the first object stored in said first storage means based on said first path information;

(b) evaluating a certificate of an object provider included in said first object; and (c) if, as a result of the said evaluation, it is determined that said first object has not been created by a proper provider, then accessing the second object stored in said second storage means based on said second path information.

In another aspect of this invention, there is provided a method of accessing an object, the method being adapted for execution in a local system that contains first path information specifying a path for accessing a first object stored in a first storage means, second path information specifying a path for accessing a second object stored in a second storage means, and public key information of an object provider, the method comprising the steps of:

(a) accessing the first object stored in said first storage means based on said first path information;

(b) decrypting encrypted data included in the first object by using said public key;

(c) determining whether or not a result of the said decryption matches a predetermined condition; and (d) if it is determined that the result of the said decryption does not match the predetermined condition, then accessing the second object stored in said second storage means based on said second path information.

In another aspect of this invention, there is provided a method of accessing an object in response to an object access request including object specifying information transmitted from a local system via a network, the method comprising the steps of:

(a) determining whether or not a record corresponding to said object specifying information exists in an object management table;

(b) if the record exists, then determining whether or not a term of an associated object has been expired;

(c) if the term of said associated object has not been expired, then enabling the said object to be accessed; and (b) if the term of said associated object has been expired, then prohibiting the said object from being accessed.

In another aspect of this invention, there is provided an apparatus for accessing an object, comprising:

(a) first path information specifying a path for accessing a first object stored in a first storage means;

(b) second path information specifying a path for accessing a second object stored in a second storage means;

(c) third path information specifying a path for accessing a third object stored in a third storage means; and (d) a stub object for:

(d1) accessing the first object stored in said first storage means based on said first path information, (d2) evaluating object management information included in said first object, (d3) if, as a result of the said evaluation, it is determined that the object management information of said first object does not match a predetermined condition, then accessing the second object stored in said second storage means based on said second path information, (d4) evaluating object management information included in said second object, and (d5) if, as a result of the said evaluation, it is determined that the object management information of said second object does not match a predetermined condition, then accessing the third object stored in said third storage means based on said third path information.

In another aspect of this invention, there is provided an apparatus for accessing an object, comprising:

(a) first path information specifying a path for accessing a first object stored in a first storage means;

(b) second path information specifying a path for accessing a second object stored in a second storage means; and (c) a stub object for:

(c1) accessing the first object stored in said first storage means based on said first path information, (c2) evaluating a certificate of an object provider included in said first object, and (c3) if, as a result of the said evaluation, it is determined that said first object has not been created by a proper provider, then accessing the second object stored in said second storage means based on said second path information.

In another aspect of this invention, there is provided an apparatus for accessing an object, comprising:

(a) first path information specifying a path for accessing a first object stored in a first storage means;

(b) second path information specifying a path for accessing a second object stored in a second storage means;

(c) public key information of an object provider; and (d) a stub object for:
   (d1) accessing the first object stored in said first storage means based on said first path information,
   (d2) decrypting encrypted data included in the first object by using said public key,
   (d3) determining whether or not a result of the said decryption matches a predetermined condition, and
   (d4) if it is determined that the result of the said decryption does not match the predetermined condition, then accessing the second object stored in said second storage means based on said second path information.

In another aspect of this invention, there is provided an information processing system, comprising:

(a) an object accessing apparatus, including:
   (a1) first path information specifying a path for accessing a first object stored in a first storage means,
   (a2) second path information specifying a path for accessing a second object stored in a second storage means,
   (a3) third path information specifying a path for accessing a third object stored in a third storage means, and
   (a4) a stub object for accessing the first object stored in said first storage means based on said first path information, evaluating object management information included in said first object, if, as a result of the said evaluation, it is determined that the object management information of said first object does not match a predetermined condition, then accessing the second object stored in said second storage means based on said second path information, evaluating object management information included in said second object, and if, as a result of the said evaluation, it is determined that the object management information of said second object does not match a predetermined condition, then accessing the third object stored in said third storage means based on said third path information; and (b) an object server for receiving an object access request including object specifying information transmitted from said object accessing apparatus via a network, determining whether or not a record corresponding to said object specifying information exists in an object management table, if the record exists, then evaluating object management information of an associated object, if the object management information of said associated object matches a predetermined condition, then enabling the said object to be accessed, and if the object management information of said associated object does not match the predetermined condition, then prohibiting the said object from being accessed.

In another aspect of this invention, there is provided a storage medium for storing a program executable in a local system that contains first path information specifying a path for accessing a first object stored in a first storage means, second path information specifying a path for accessing a second object stored in a second storage means, and third path information specifying a path for accessing a third object stored in a third storage means, the program being adapted for controlling access to an object, comprising:

(a) program code for indicating said local system to access the first object stored in said first storage means based on said first path information;

(b) program code for indicating said local system to evaluate object management information included in said first object;

(c) program code, being responsive to a determination that the object management information of said first object does not match a predetermined condition, for indicating said local system to access the second object stored in said second storage means based on said second path information;

(d) program code for indicating said local system to evaluate object management information included in said second object; and (e) program code, being responsive to a determination that the object management information of said second object does not match a predetermined condition, for indicating said local system to access the third object stored in said third storage means based on said third path information.

In another aspect of this invention, there is provided a storage medium for storing a program executable in a local system that contains first path information specifying a path for accessing a first object stored in a first storage means, and second path information specifying a path for accessing a second object stored in a second storage means, the program being adapted for controlling access to an object, comprising:

(a) receiving from an application an object access request including object specifying information;

(b) program code for indicating said local system to access the first object stored in said first storage means based on said first path information;

(c) program code for indicating said local system to evaluate object management information included in said first object; and (d) program code, being responsive to a determination that the object management information of said first object does not match a predetermined condition, for indicating said local system to access the second object stored in said second storage means based on said second path information.

In another aspect of this invention, there is provided a storage medium for storing a program executable in a local system that contains first path information specifying a path for accessing a first object stored in a local storage means existing within the local system, and second path information specifying a path for accessing a second object stored in a remote storage means connected to said local system via a network, the program being adapted for controlling access to an object, comprising:

(a) program code for indicating said local system to access the first object stored in said local storage means based on said first path information;

(b) program code for indicating said local system to evaluate term's validity information included in said first object;

(c) program code, being responsive to a determination that the term of said first object has been expired, for indicating said local system to access the second object stored in said remote storage means based on said second path information;

(d) program code for indicating said local system to copy at least a portion of said object into said local storage means.

In another aspect of this invention, there is provided a storage medium for storing a program executable in a local system that contains first path information specifying a path for accessing a first object stored in a first storage means, and second path information specifying a path for accessing a second object stored in a second storage means, the program being adapted for controlling access to an object, comprising:

(a) program code for indicating said local system to access the first object stored in said first storage means based on said first path information;

(b) program code for indicating said local system to evaluate a certificate of an object provider included in said first object; and (c) program code, being responsive to a determination that said first object has not been created by a proper provider, for indicating said local system to access the second object stored in said second storage means based on said second path information.

In another aspect of this invention, there is provided a storage medium for storing a program executable in a local system that contains first path information specifying a path for accessing a first object stored in a first storage means, second path information specifying a path for accessing a second object stored in a second storage means, and public key information of an object provider, the program being adapted for controlling access to an object, comprising:

(a) program code for indicating said local system to access the first object stored in said first storage means based on said first path information;

(b) program code for indicating said local system to decrypt encrypted data included in the first object by using said public key;

(c) program code for indicating said local system to determine whether or not a result of the said decryption matches a predetermined condition; and (e) program code, being responsive to a determination that the result of the said decryption does not match the predetermined condition, for indicating said local system to access the second object stored in said second storage means based on said second path information.

In another aspect of this invention, there is provided a storage medium for storing a program being responsive to an object access request including object specifying information transmitted from a local system via a network, the program being adapted for controlling access to an object, comprising:

(a) program code for indicating said local system to determine whether or not a record corresponding to said object specifying information exists in an object management table;

(b) program code, being responsive to a determination that the record exists, for indicating said local system to determine whether or not object management information of an associated object matches a predetermined condition;

(c) program code, being responsive to a determination that the object management information of said associated object matches the predetermined condition, for indicating said local system to enable the said object to be accessed; and (d) program code, being responsive to a determination that the object management information of said associated object does not match the predetermined condition, for indicating said local system to prohibit the said object from being accessed.

Description of an Embodiment of the Invention

Now, with reference to the drawings, an embodiment of this invention will be described.

A. Hardware Configuration

In FIG. 1, there is schematically shown a hardware configuration of a local system 100 (to be detailed below using FIG. 2) used in this invention. The local system 100 includes a central processing unit (CPU) 1 and a memory 4. CPU 1 and the memory 4 are connected to a hard disk drive 13 as an auxiliary storage device via a bus 2. A floppy disk drive (or another drive such as an MO drive or a CD-ROM drive) 20 is connected to the bus 2 via a floppy disk controller 19 (or another controller such as an IDE controller or a SCSI controller).

A floppy disk (or another medium such as an MO disk or a CD-ROM) inserted into the floppy disk drive 20, the hard disk drive 13 and/or a ROM 14 is capable of storing a computer program code for practicing this invention. At the time of execution, this computer program code is loaded into the memory 4 such that it cooperates with an operating system to provide instructions to CPU or the like. This computer program code may be compressed or divided into a plurality of segments for storing onto a plurality of media.

Also, the local system 100 may be provided with user interface hardware, including a pointing device (such as a mouse or a joystick) 7 or a keyboard 6 for input entry, as well as a display 12 for presenting visual data to a user. A touch panel may be provided as an additional input means. Also, a printer and a modem may be connected via a parallel port 16 and a serial port 15 respectively. This local system 100 may be connected to a network via the serial port 15 and a modem or a communication adapter 18 (Ethernet or token ring card) for communicating with other computers.

A speaker 23 receives audio signals that are D/A (digital/analog) converted by an audio controller 21 via an amplifier 22, and outputs the audio signals as sounds. Also, the audio controller 21 may perform an A/D conversion of audio information received from a microphone 24, thereby to capture the external audio information into the system.

It will be readily understood from the foregoing that the local system 100 of this invention may be implemented by a communication terminal having communication functions, including a conventional personal computer (PC), a workstation, a notebook PC, a palm top PC, a network computer or the like, and any combinations thereof. Note, however, that these elements are listed for exemplification purpose only, and all of these elements are not necessarily equated with essential elements of this invention.

In particular, since the hardware configuration explained here is merely required for accessing an execution object and for checking its content in response to a request from an application, those elements listed below are non-essential elements. They are: audio controller 21, amplifier 22, speaker 23 and microphone 24 used for audio processing, keyboard 6, mouse 7 and keyboard/mouse controller 5 used for direct input entry from an operator; CRT 12, a display device 11, VRAM 9 and VGA 8 used for presenting visual data to a user; and a variety of storage medium controllers 19, 25, 27 and the like.

It will be readily understood by those skilled in the art that various modifications to respective elements of this local system 100, including but not limited to combining a plurality of machines and distributing implemented functions among these machines, may be made without departing from the spirit and scope of the concept of this invention.

Remote systems 141, 145 and an execution object server 150 (see FIG. 2), which are used in this invention, may be implemented by the hardware configuration as shown in FIG. 1 in the same manner as the local system 100. That is, since they require limited functions for authorizing a reference to an execution object in response to a request from the local system 100, it will be readily understood by those skilled in the art that they may be each implemented by a conventional personal computer (PC), a workstation, a notebook PC, a palm top PC, a variety of household electric appliances such as TV sets incorporating computers, a game machine having communication functions, a communication terminal having communication functions (such as a telephone, a FAX machine, a mobile telephone, a PHS or an electronic memorandum book), and any combinations thereof.

An operating system on the local system 100, remote systems 141, 145 and the execution object server 150 is not limited to a particular operating system environment and it may be implemented by: those supporting a GUI multiwindow environment such as "WindowsNT" (trademark of Microsoft Corp.), "Windows95" (trademark of Microsoft Corp.), "Windows3.x" (trademark of Microsoft Corp.), "OS/2" (trademark of IBM Corp.), "MacOS" (trademark of Apple Computer, Inc.) or "X-WINDOWS system" (trademark of X Consortium) on "AIX" (trademark of IBM Corp.); those supporting a character base environment such as "PC-DOS" (trademark of IBM Corp.) or "MS-DOS" (trademark of Microsoft Corp.); those categorized as realtime OS such as "OS/Open" (trademark of IBM Corp.) or "VxWorks" (trademark of Wind River Systems, Inc.); another OS such as "JavaOS".

B. System Configuration

FIG. 2 is a functional block diagram showing a system configuration of an information processing system in this embodiment, which comprises the local system 100, remote systems 141, 145 and execution object server 150.

The local system 100 is connected to the remote systems 141, 145 and object server 150 via a network 140, thereby to access execution objects 127, 129 and the like.

On the local system 100, an application 115 and a stub object 110 are running. Also, it is provided with a program execution environment 131 for supporting operations of the application 115 and the stub object 110.

This environment 131 includes an OS and various drivers for implementing "JavaVM" (Virtual Machine). Also, by means of its timer/calendar function, it is capable of obtaining information on the current time of day.

Further, this environment 131 can make use of a default object retrieval path 133, which is stored in the form of a prioritized path list.

An independent certificate authority 170 is responsive to a request from a provider of an execution object (shown as "provider" in the drawings) for issuing a digital certificate 161 of the provider, which is encrypted using a secret key 163 of the provider and a secret key of the authority 170. Also, the authority 170 sends its public key and a public key 171 of the provider to the local system 100.

As shown in FIG. 3, each of the execution objects 121 to 129 contains, in addition to its conventional data/method 223, its term's validity information 201, a certificate 210 and an electronic signature 221 of its provider.

The term's validity information 201 defines a valid term or a date, during which the associated provider (of anyone of the execution objects 121 to 129) assures that contents of its data/method 223 are valid. The certificate 210, which is issued by the authority 170 and encrypted using its secret key, contains an identifier 211 and a public key 213 of the associated provider to be certified.

The signature 221 of the associated provider (signer), which represents data encrypted using the provider's secret key 163, enables to confirm that the data is not corrupted since it has been created by the provider. This is because it is possible to decrypt the data using the provider's public key 213 and, in a case where the ciphertext represents a digest of the data, it is possible to check if a decrypted digest matches another digest newly created from the original plaintext.

The above techniques used in this embodiment, i.e., public key enciphering, electronic certificate and electronic signature, are not described here in further detail since they are already known to those skilled in the art before filing of the present application.

Note that each of the execution objects 121 to 129 has a method for referring to each said data respectively.

The stub object 110 is an object that is distributed to a user of an execution object from its provider by any adequate means (e.g., direct downloading from the object server 150, or storing it into an information recording medium such as a floppy disk and mailing the same). The stub object 110 is stored onto a predetermined object retrieval path of the local system 100.

As shown in FIG. 4, the stub object 110 contains the following described information for providing various functions, such as checking credibility of execution objects, requesting their transfer, deciphering them and accessing them.

An object retrieval path 260 is information of paths for retrieving execution objects and, in this embodiment, it is stored in the form of a path list as shown in FIG. 4. In this path list 260, a plurality of retrieval paths may be set up in a prioritized manner. Referring to FIG. 2 by way of example, this enables to define a procedure that the execution objects 121, 123 existing on the local system 100 in its local store 120 have first and second accessing priorities, the execution objects 127, 129 existing on the remote systems 141, 145 have third and forth accessing priorities, and in an exceptional case where a desired execution object cannot be obtained, an execution object existing on the object server 150 is accessed.

Execution object server's information 263 is used for accessing the object server 150. An identifier 265 (e.g., a name of the execution object, a retrieval equation, or the like) is used for specifying an execution object.

Similarly to the certificate 210 of FIG. 3 above, a certificate 270 of a provider, which is issued by the authority 170 and encrypted using its secret key, contains an identifier 271 and a public key 273 of the provider to be certified. Also, similarly to the case of FIG. 3, an electronic signature 271 of the provider, which represents data encrypted using the secret key 163 of the provider, enables to confirm that the data is not corrupted since it has been created by the provider. This is because it is possible to decrypt the data using the public key 273 of the provider and, in a case where the ciphertext represents a digest of the data, it is possible to check if a decrypted digest matches another digest newly created from the original plaintext.

The object server 150, which is managed by the associated provider, is responsive to a request from the stub object 110 for notifying term's validity (guaranteed term of availability) of each version of execution objects. Also, the object server 150 contains the newest execution objects, thereby allowing the stub object 110 to access the same. Referring to FIG. 5, the object server 150 has an execution object management table 300, which contains execution objects' identifiers 301, term's validity information 303 of respective versions of the execution objects and pointers 305 to the execution objects.

The execution objects' identifiers 301 specify execution objects, whereas the term's validity information 303 defines valid terms of respective versions of the execution objects. The pointers 305 designate locations where the execution objects are stored.

In this embodiment, respective objects on the object server 150 are rendered to have specific names, each comprising a combination of an object name plus version information, since it is necessary to manage in the local system 100 those objects with the same names but with different contents. In transmission to the local system 100, these objects are automatically renamed to another form with the version information removed. In so doing, on a remote system's side, it is possible to use, without changing an application, an execution object with its content updated.

C. Checking/Referencing of Execution Object

FIGS. 6 and 7 are flow charts showing a procedure in this embodiment for checking/referencing of an execution object. As illustrated, when the stub object 110 receives an execution request for a method of an execution object, i.e., method execution request, from the application 115, the present procedure is started (block 451).

Next, based on an execution object's identifier contained in the method execution request, the stub object 110 refers to its internally stored identifier 265 of an execution object (see the above explanation of FIG. 4), retrieves the object retrieval path 260, default object retrieval path 133 and execution object server's information 263. Then, the stub object 110 determines a path among them in accordance with a predetermined priority scheme, thereby to obtain an object of the highest priority from this path (block 453). In this embodiment, this sequence is defined to be in the order of those objects existing in the local system 100, in a domain, in the remote systems 141, 145 and in the object server 150. Alternatively, this path list may be provided for each objects to be utilized.

Next, the stub object 110 compares the certificate 210 (FIG. 3) of this execution object so obtained with the certificate 270 (FIG. 4) contained in the stub object 110 to check its provider (blocks 455, 457). If the provider is improper one, the present procedure proceeds to block 475 for obtaining an execution object by another path, as described below.

Conversely, if the provider is proper one, the term's validity information 201 in this execution object is checked to see whether or not its term has been expired (blocks 459 to 463). Note that, in this embodiment, this information 201 is checked to determine if it has a special value indicating necessity of inquiry (block 459) and, if so, the stub object 110 refers to the execution object server's information 263 to inquire of the object server 150 about the term's validity information 303 of this execution object designated by its corresponding identifiers 301 (FIG. 5), thereby obtaining the term's validity information. This is because there is ever changing information (e.g., the yen-dollar rate), whose valid term cannot be predetermined.

If the valid term of this execution object has been expired (block 463), the present procedure proceeds to block 475 for obtaining an execution object by another path.

Conversely, if the valid term of this execution object has not been expired (block 463), it is checked whether or not this execution object contains any signature (data) 221 encrypted using a secret key 163 of its provider (block 465) and, if so, the encrypted data is decrypted using the provider's public key 273 contained in the certificate 270.

In this embodiment, the electronic signature 221 is rendered to contain a portion of the conventional data/method 223 that is encrypted using the provider's secret key 163. If the data/method 223 accessed by a user is not corrupted, its decrypted content should match a portion of the data/method 223 that is extracted by a similar logic.

If such decryption fails (i.e., if the extracted portion of the conventional data/method 223 does not match the decrypted content of the signature 221), the user is notified of any corruption of this execution object (blocks 465, 467), and the present procedure proceeds to block 475 for obtaining an execution object by another path.

After passing all tests of provider (block 457), term's validity (block 463) and corruption (blocks 465, 467), if the present path used for obtaining this execution object has a lower priority, the stub object 110 copies this execution object into a location of the highest priority on this object retrieval path (block 471). Then, it accesses the copied execution object, executes the method 223 contained in this execution object and the present procedure is terminated (block 483).

Conversely, if anyone of said tests fails, this execution object already attempted to be accessed is invalidated, which is then detached from the default retrieval path 133 and the retrieval path 260 internally stored in the stub object 110 (block 475).

Then, from a next entry on the default retrieval path 133 or the retrieval path 260 internally stored in the stub object 110, another execution object designated by the execution object's identifier is retrieved (block 481), thereby to perform said tests again.

If anyone of said tests fails again even in a case where the execution object server's information 263 is referred to for accessing the object server 150 and for directly obtaining a targeted execution object, the user is notified of failure of all attempts (block 479) and the present procedure is terminated (block 483).

FIG. 8 is a flow chart showing an operational procedure of the object server 150 in this embodiment. As illustrated, when the object server 150 receives a message from the stub object 110, the present procedure is started (block 401).

At first, the object server 150 checks whether or not the received message is a request for inquiring the term's validity information 303 (block 403). If so, the object server 150 retrieves the execution object management table 300 based on an execution object's identifier contained in the received message, obtains its corresponding term's validity information 303, and sends a message including this information 303 to the stub object 110 (block 405).

Conversely, if the received message is not a request for inquiring the term's validity information 303, the object server 150 checks whether or not the received message is a request for accessing an execution object (block 407). If not, the object server 150 returns an error message to the stub object 110 (block 419).

Conversely, if the received message is a request for accessing an execution object, the object server 150 retrieves the execution object management table 300 based on an execution object's identifier contained in the received message, and checks whether or not there exists a corresponding record (blocks 409, 411). If so, then it is determined whether or not the term of its corresponding execution object is still valid (block 413). If so, then it is determined whether or not this execution object is designated by its pointer 305, i.e., whether or not this execution object has been invalidated by an operation such as a delete operation (block 415).

If this execution object is determined to be valid, access thereto is allowed/implemented (block 417), and then the present procedure is terminated (block 421). Conversely, a test at anyone of the blocks 407, 411, 413 and 415 results in a negative determination, an error message is transmitted to the stub object 110 (block 419), and the present procedure is terminated (block 421).

Advantages of the Invention

As described above, in accordance with this invention, it is possible to provide an information processing system that enables a user to always use a business object in the assurance of its credibility.

In accordance with one aspect of this invention, it is possible to provide an information processing system that is secure against usage of a business object corrupted by a third party.

In accordance with another aspect of this invention, it is possible to provide an information processing system that enables to flexibly change a site which should obtain an object to be used.

In accordance with another aspect of this invention, it is possible to reduce an amount of user's work required for changing an object to be used.

In accordance with another aspect of this invention, it is possible to provide a computer system that does not depend on a platform of a local system.

In accordance with another aspect of this invention, it is possible to reduce an amount of communication data in an information processing system.

In accordance with another aspect of this invention, it is possible to provide an information processing system that enables to flexibly provide an object which should have a content requested by an application.

In accordance with another aspect of this invention, it is possible to provide, as a framework of a business object, a common mechanism for assuring security of an object transferred in a network environment.

In accordance with another aspect of this invention, it is possible to provide an assurance of credibility even in an environment provided with a weak security mechanism such as a Java environment.

In accordance with another aspect of this invention, it is possible to provide a system that enables to maintain credibility of such information with a fixed time limit (e.g., rule set, including a currency exchange rate, an accounting rule, a tax law or the like) and to make a reference thereto on a real-time basis.

It is noted that this invention may be used for many applications. Although the description is made for particular arrangements and applications, the intent and concept of the invention is suitable and applicable to other arrangements and applications. It will be clear to those skilled in the art that other modifications to the disclosed embodiments can be effected without departing from the spirit and scope of the invention.

What is claimed is:

1. A method of accessing an object, said object, as used in object oriented programming, being software comprising a program or program with data accessed by said program, the method being adapted for execution in a local system that contains first path information specifying a path for accessing a first object stored in a first storage means, second path information specifying a path for accessing a second object stored in a second storage means, and third path information specifying a path for accessing a third object stored in a third storage means, said path in each instance being an information/description list which points to the location of an object in a network, to access said object, the method comprising the steps of:

(a) accessing the first object stored in said first storage means based on said first path information;

(b) evaluating object management information included in said first object;

(c) if, as a result of said evaluation, it is determined that the object management information of said first object does not match a predetermined condition, then accessing the second object stored in said second storage means based on said second path information;

(d) evaluating object management information included in said second object; and (e) if, as a result of said evaluation, it is determined that the object management information of said second object does not match a predetermined condition, then accessing the third object stored in said third storage means based on said third path information.

2. A method of accessing an object, said object, as used in object oriented programming, being software comprising a program or program with data accessed by said program, the method being adapted for execution in a local system that contains first path information specifying a path for accessing a first object stored in a first storage means, and second path information specifying a path for accessing a second object stored in a second storage means, said path in each instance being an information/description list which points to the location of an object in a network, to access said object, the method comprising the steps of:

(a) receiving from an application an object access request including object specifying information;

(b) accessing said first object stored in said first storage means based on said first path information;

(c) evaluating object management information included in said first object; and (d) if, as a result of the said evaluation, it is determined that said object management information of said first object does not match a predetermined condition, then accessing said second object stored in said second storage means based on said second path information.

3. A method of accessing an object, the method being adapted for execution in a local system that contains first path information specifying a path for accessing a first object stored in a local storage means existing within the local system, and second path information specifying a path for accessing a second object stored in a remote storage means connected to said local system via a network, the method comprising the steps of:

(a) accessing said first object stored in said local storage means based on said first path information;

(b) evaluating a term's validity information included in said first object;

(c) if, as a result of said evaluation, it is determined that said term of said first object has expired, then accessing said second object stored in said remote storage means based on said second path information; and (d) copying at least a portion of said object into said local storage means.

4. An apparatus for accessing an object, said object, as used in object oriented programming, being a software comprising a program or program with data accessed by said program, comprising (a) first path information specifying a path for accessing a first object stored in a first storage means, (b) second path information specifying a path for accessing a second object stored in a second storage means, (c) third path information specifying a path for accessing a third object stored in a third storage means, said path in each instance being an information/description list which points to the location of an object in a network, to access said object; and (d) a stub object for:
(d1) accessing said first object stored in said first storage means based on said first path information;
(d2) evaluating object management information included in said first object;
(d3) if, as a result of said evaluation, it is determined that said object management information of said first object does not match a predetermined condition, then accessing said second object stored in said second storage means based on said second path information;
(d4) evaluating object management information included in said second object; and
(d5) if, as a result of said evaluation, it is determined that said object management information of said second object does not match a predetermined condition, then accessing said third object stored in said third storage means based on said third path information.

5. An information processing system comprising:

(a) an object accessing apparatus, said object, as used in object oriented programming, being a software comprising a program or program with data accessed by said program, including,
(a1) first path information specifying a path for accessing a first object stored in a first storage means,
(a2) second path information specifying a path for accessing a second object stored in a second storage means,
(a3) third path information specifying a path for accessing a third object stored in a third storage means, said path in each instance being an information/description list which points to the location of an object in a network, to access said object; and (d) a stub object for accessing said first object stored in said first storage means based on said first path information;
evaluating object management information included in said first object;
if, as a result of said evaluation, it is determined that said object management information of said first object does not match a predetermined condition, then accessing said second object stored in said second storage means based on said second path information; evaluating object management information included in said second object; and if, as a result of said evaluation, it is determined that said object management information of said second object does not match a predetermined condition, then accessing said third object stored in said third storage means based on said third path information; and (b) an object server for receiving an object access request including object specifying information transmitted from said object accessing apparatus via a network, determining whether or not a record corresponding to said object specifying information exists in an object management table, if the record exists, then evaluating the object management information of an associated object, if the object management information of said associated object matches a predetermined condition, then enabling said object to be accessed, and if the object management information of said associated object does not match the predetermined condition, then prohibiting said object from being accessed.

6. A storage medium for storing a program executable in a local system than contains the first path information specifying a path for accessing a first object stored in a first storage means, second path information specifying a path for accessing a second object stored in a second storage means, third path information specifying a path for accessing a third object stored in a third storage means, the program being adapted for controlling access to an object, said object, as used in object oriented programming, being a software comprising a program or program with data accessed by said program and said path in each instance being an information/description list which points to the location of an object in a network, to access said object; comprising:

(a) program code for indicating said local system to access said first object stored in said first storage means based on said first path information;

(b) program code for indicating said local system to evaluate object management information included in said first object;

(c) program code, being responsive to a determination that said object management information of said first object does not match a predetermined condition, for indicating said local system to access the second object stored in said second storage means based on said second path information;

(d) program code for indicating said local system to evaluate object management information included in said second object; and (e) program code, being responsive to a determination that said object management information of said second object does not match a predetermined condition, for indicating said local system to access said third object stored in said third storage means based on said third path information.

7. A storage medium for storing a program executable in a local system that contains first path information specifying a path for accessing a first object stored in a first storage means, second path information specifying a path for accessing a second object stored in a second storage means, third path information specifying a path for accessing a third object stored in a third storage means, said object, as used in object oriented programming, being a software comprising a program or program with data accessed by said program and said path in each instance being an information/description list which points to the location of an object in a network, to access said object; the program being adapted for controlling access to an object comprising:

(a) program code for indicating said local system to access said first object stored in said first storage means based on said first path information;

(b) program code for indicating said local system to evaluate object management information included in said first object;

(c) program code, being responsive to a determination that said object management information of said first object does not match a predetermined condition, for indicating said local system to access said second object stored in said second storage means based on said second path information.

8. A storage medium for storing a program executable in a local system that contains first path information specifying a path for accessing a first object stored in a first storage means, and second path information specifying a path for accessing a second object stored in a remote second storage means connected to said local system via a network, said object, as used in object oriented programming, being a software comprising a program or program with data accessed by said program and said path in each instance being an information/description list which points to the location of an object in a network, to access said object; the program being adapted for controlling access to an object, comprising:

(a) program code for indicating said local system to access said first object stored in said first storage means based on said first path information;

(b) program code for indicating said local system to evaluate a term's validity information included in said first object;

(c) program code, being responsive to a determination that said term of said first object has expired, for indicating said local system to access said second object stored in said remote storage means based on said second path information;

(d) program code for indicating said local system to copy at least a portion of said object into said local storage means.

9. A storage medium for storing a program being responsive to an object request including object specifying information transmitted from a local system via a network, the program being adapted for controlling access to an object, said object, as used in object oriented programming, being a software comprising a program or program with data accessed by said program, said storage medium comprising:

(a) program code for indicating said local system to determine whether or not a record corresponding to said object specifying information exists in an object management table;

(b) program code being responsive to a determination that the record exists, for indicating said local system to determine whether or not object management information of an associated object matches a predetermined condition;

(c) program code, being responsive to a determination that the object management information of said associated object matches a predetermined condition, for indicating said local system to enable the said object to be accessed; and (d) program code, being responsive to a determination that the object management information of said associated object does not match the predetermined condition, for indicating said local system to prohibit the said object from being accessed.

* * * * *